Patented Dec. 16, 1947

2,432,773

UNITED STATES PATENT OFFICE 2,432,773

COATED WELDING ELECTRODE

Richard K. Lee, York, Pa., assignor to
The McKay Company

No Drawing. Application April 11, 1944,
Serial No. 530,559

5 Claims. (Cl. 219—8)

1

The present invention relates to welding. More particularly, it relates to the welding of low alloy, high tensile steels or other steels whose alloy content or high hardenability render them difficult to weld.

Heretofore considerable difficulty has been encountered in the welding of such steels. Where conventional electrodes and conventional methods have been employed, underbead cracking, porosity in the weld metal and other objectionable results have been obtained. In order to obviate these difficulties various expedients have been employed such as preheating of the work, preheating of the electrode, and the use of austenitic electrodes. However, these expedients are unsatisfactory, time-consuming and expensive.

Mild steel electrodes have been tried heretofore for welding such steels but with unsatisfactory results. The weld metal differs substantially from the part or parts welded and the properties of the weld are different than those of the parts welded. Weld cracks and under-bead cracks are prevalent. Preheating is frequently required. Moreover such electrodes are wholly unsuited to the welding of heat treated steels.

Low alloy electrodes have also been tried with like unsatisfactory results. Low welding temperatures and low speeds are required to avoid slag and bead peculiarities. Preheating is generally required in order to prevent weld cracks and under-bead cracks. Porosity of the weld is a persistent hazard. Moreover, such electrodes are wholly unsuited to the welding of heat treated steels.

Austenitic electrodes have also been tried, but with unsatisfactory results. The weld metal differs appreciably from the welded article and, hence, responds entirely differently to heat treatment. Also, such electrodes are costly.

The National Research Council has developed an electrode for welding such steels, but it, likewise, has been found unsatisfactory. It may be used for welding some unheat-treated and some heat-treated steels of the character in question but in neither case can it be used for welding all such steels. For example, this electrode cannot be used satisfactorily for welding Navy STS steel. Porosity in the weld metal is particularly difficult to control and it has been necessary to resort to preheating of the work or the electrode.

By the present invention, I provide a welding electrode for and a method of welding such steels which avoid the difficulties mentioned above and which permit the welding of these difficultly

2 weldable steels in all thicknesses and in accordance with ordinary welding practices employed in the welding of simple steels. I have found that by using a weld rod which will deposit a carbon steel or low alloy weld metal, having manganese less about 1.25% therein, in the presence of a shielding atmosphere high in carbon monoxide and/or carbon dioxide and, conversely, low in other constituents, particularly hydrogen, the difficulties mentioned above can be eliminated and a sound weld obtained. I have found that the desired shielding atmosphere may be obtained by using a coating on the weld rod containing calcium carbonate. In the welding operation the calcium carbonate is calcined and this gives an envelope which is high in carbon monoxide and carbon dioxide and relatively low in hydrogen. For example, the ordinary stainless type of coating, whose distinguishing characteristics are that it deposits metal under a basic slag fluxed with calcium fluoride and shielded by an atmosphere largely supplied by the calcination of calcium carbonate, may be used. However, my invention is not limited to the use of a coating containing calcium carbonate, as other coating constituents, such as calcium oxalate, magnesium carbonate and other materials which liberate quantities of carbon oxides, may be used to provide the proper atmosphere.

It will be apparent from what has been stated that my invention may be embodied in and carried out with a wide variety of coated electrodes. The desired constituents in the weld metal may be obtained from the rod or from the coating carried by the rod or from both. The desired constituents in the slag may be derived from the coating or from both the rod and the coating. Ordinary killed or rimmed carbon steel or a low-alloy steel may be used for the core wire or rod. The coating may be of any desired type which, in conjunction with the rod, will provide a proper weld metal analysis containing less than 1.25% manganese in the presence of a slag (preferably basic) and a shielding atmosphere high in carbon monoxide and/or carbon dioxide.

In welding low alloy, high tensile steels in accordance with my invention, I prefer that the weld metal analysis be within the following ranges:

| | Per cent |
|---|---|
| Carbon | .05 to .10 |
| Manganese | .50 to .90 |
| Silicon | .12 to .25 |

However, to match the analysis of the steel being welded the deposit may be varied between the following limits:

| | Per cent |
|---|---|
| Carbon | .03 to .30 |
| Manganese | .30 to 1.25 |
| Silicon | .05 to 1.25 |

In addition, various alloys such as molybdenum, nickel, chromium, copper, etc. may be added for the properties which they confer and in the amounts common to high tensile steels. The character and extent of the alloys employed are based upon considerations of the steel to be welded, the physical or chemical properties desired in the weld metal and the cost. Their presence does not change the primary considerations, and they may enter the deposit of weld metal through the core wire, the coating or both. As stated, the core wire may be rimmed or killed carbon steel or a desired low-alloy steel.

I have found that a suitable weld metal, slag and atmosphere can be obtained by coating a low-alloy core wire or a killed or rimmed carbon steel wire with a composition embodying the following:

| | Percent |
|---|---|
| Calcium carbonate | 20 to 70 |
| Calcium fluoride | 15 to 60 |
| Ferro manganese | 2 to 7 |
| Sodium silicate | as desired |

In view of what has been stated, it will be obvious that various constituents can be substituted in the coating for those mentioned above. For example, magnesium carbonate can be employed instead of calcium carbonate, mineral cryolite can be substituted for the calcium fluoride, and potassium silicate can be substituted for the sodium silicate.

To control and modify the behavior of the coating during application and melting, such common coating ingredients as the following may be additionally employed: clay, titanium dioxide, zirconium oxide, silica, manganese oxide, etc.

To control and modify the composition of the deposit such common metallic ingredients as the following may be additionally employed in the coating: ferro-molybdenum, ferro-chromium, ferro-silicon, manganese, ferro-vanadium, copper, nickel, etc.

While the coating may be varied widely, depending upon the particular work, I have found it important that the coating contain a carbonate or a material which, like a carbonate, will provide a carbon monoxide and/or carbon dioxide atmosphere or one which is relatively low in hydrogen at the weld locus. Hydrogen is thought to be deleterious and to promote under-bead cracking when dissolved by the molten weld metal or absorbed into the hot parent metal near the weld. Consequently, I propose to substantially eliminate it from the weld locus in the manner stated.

While the slag composition may vary widely, I have found that a slag of the following type is desirable:

| | Percent |
|---|---|
| Alkaline earth oxides | 15 to 40 |
| Calcium fluorides or other fluorides | 10 to 40 |
| Silicon dioxide | 5 to 30 |
| Iron or manganese oxide | 5 to 30 |
| Titanium dioxide | 0 to 55 |
| Alkali metal oxides | 1 to 8 |
| Aluminum oxide | 0 to 8 |

As indicated above, the analysis of the weld metal will depend upon the particular work. Where a particularly difficult metal from the welding standpoint is to be welded, such as Navy specification HTS steel, I have found that a suitable weld metal analysis is as follows:

| | |
|---|---|
| Carbon | .07 |
| Manganese | .75 to .90 |
| Silicon | .15 to .17 |
| Molybdenum | .50 to .55 |

The core wire of the electrode for providing the weld metal analysis mentioned above would comprise the following:

| | |
|---|---|
| Carbon | .09 |
| Manganese | .40 to .50 |
| Silicon | .06 |

In the weld metal analysis and the core wire analysis set forth above, the balance in each case is substantially iron except for the usual impurities.

In carrying out my invention, the core wire is coated with the coating composition by any of the known processes. After the coating is formed and baked, the electrode may be employed in the usual manner to deposit the weld metal at the weld locus.

Throughout this specification I have used the term "low alloy, high tensile steel." I include within this term all of those steels which are generally known in the trade by this name; such, for example, as those steels sold under the trade names as "Yoloy," "Nax," "R. D. S.," "Otiscoloy," "Jal Ten," "Corten,' "Mayari," "H. D. 50," and heat treatable armor compositions. All such steels have a substantial amount of manganese in them ranging from approximately .35% to 1.50%.

I claim:

1. A welding electrode for welding low alloy, high tensile steel comprising a core wire containing carbon from about .03% to .30%, silicon from about .05% to 1.25%, and manganese from about .30% to 1.25%, the balance being substantially all commercial iron except that it may contain small amounts of alloying elements, and a coating thereon comprising about 20% to 70% of a carbonate of the group consisting of magnesium carbonate and calcium carbonate, and a binder.

2. A welding electrode for welding low alloy, high tensile steel comprising a core wire containing carbon from about .03% to .30%, silicon from about .05% to 1.25% and manganese from about .30% to 1.25%, the balance being substantially all commercial iron except that it may contain small amounts of alloying elements, and a coating thereon comprising about 20% to 70% of a carbonate of the group consisting of magnesium carbonate and calcium carbonate, about 15% to 60% of calcium fluoride, and a binder.

3. A welding electrode for welding low alloy, high tensile steel comprising a core wire containing carbon from about .03% to .30%, silicon from about .05% to 1.25% and manganese from about .30% to 1.25%, the balance being substantially all commercial iron except that it may contain small amounts of alloying elements, and a coating thereon comprising about 20% to 70% of a carbonate of the group consisting of magnesium carbonate and calcium carbonate, about 15% to 60% of calcium fluoride, about 2% to 7% ferromanganese. and a binder.

4. A welding electrode for welding low alloy, high tensile steel comprising a steel core wire and a coating thereon, said core wire and coating having therein sufficient carbon, silicon and manganese to deposit at the weld locus a weld metal comprising carbon from about .03% to .30%, silicon from about .05% to 1.25% and manganese from about .30% to not over 1.25%, and said coating containing calcium carbonate or the like in an amount sufficient to provide a shielding atmosphere at the weld locus comprised principally of carbon monoxide and carbon dioxide.

5. A welding electrode for welding low alloy, high tensile steel comprising a steel core wire and a coating thereon, said core wire and coating having therein sufficient carbon, silicon and manganese to deposit at the weld locus a weld metal comprising carbon from about .03% to .30%, silicon from about .05% to 1.25% and manganese from about .30% to not over 1.25%, and said coating containing a carbonate of the group consisting of calcium carbonate and magnesium carbonate, and calcium fluoride, the carbonate comprising approximately 20% to 70% of the coating and the calcium fluoride comprising about 15% to 60% of the coating.

RICHARD K. LEE.

REFERENCES CITED

The following references are of record in the file of this patent:

UNITED STATES PATENTS

| Number | Name | Date |
|---|---|---|
| Re. 20,102 | Miller | Sept. 8, 1936 |
| 1,374,711 | Armor | Apr. 12, 1921 |
| 1,936,348 | Castle | Nov. 21, 1933 |
| 2,077,397 | Christensen | Apr. 20, 1937 |
| 1,717,530 | Thomson | June 18, 1929 |
| 1,902,948 | Castle | Mar. 28, 1933 |
| 1,339,515 | Jones | May 11, 1920 |
| 1,909,217 | Natuest | May 16, 1933 |
| 2,048,174 | Austin | July 21, 1936 |